(12) United States Patent
Chang et al.

(10) Patent No.: US 10,008,346 B1
(45) Date of Patent: Jun. 26, 2018

(54) WATERPROOF KEYBOARD

(71) Applicant: Primax Electronics Ltd., Taipei (TW)

(72) Inventors: Chia-Yuan Chang, Taipei (TW); Shao-Lun Hsiao, Taipei (TW)

(73) Assignee: Primax Electronics Ltd., Taipei (TW)

(*) Notice: Subject to any disclaimer, the term of this patent is extended or adjusted under 35 U.S.C. 154(b) by 0 days. days.

(21) Appl. No.: 15/589,119

(22) Filed: May 8, 2017

(30) Foreign Application Priority Data

Dec. 23, 2016 (CN) .......................... 201611206720.9

(51) Int. Cl.
*H01H 13/86* (2006.01)
*H01H 13/14* (2006.01)
*G06F 3/02* (2006.01)
*H01H 13/06* (2006.01)

(52) U.S. Cl.
CPC ............ *H01H 13/86* (2013.01); *G06F 3/0219* (2013.01); *H01H 13/06* (2013.01); *H01H 13/14* (2013.01)

(58) Field of Classification Search
CPC ...... H01H 13/86; H01H 13/06; G06F 3/0219; G06F 3/0224
USPC ..................................................... 200/302.2
See application file for complete search history.

(56) References Cited

U.S. PATENT DOCUMENTS

| | | | | |
|---|---|---|---|---|
| 3,586,810 A * | 6/1971 | Brown | ................... | H01H 13/06 200/302.2 |
| 4,453,061 A * | 6/1984 | Tamura | ................... | H01H 9/047 200/302.2 |
| 5,300,742 A * | 4/1994 | Huang | ................... | H01H 13/70 200/302.1 |
| 5,493,087 A * | 2/1996 | Yoshida | ................. | H01H 13/06 200/302.1 |
| 7,041,924 B2 * | 5/2006 | Jeschke | ................ | H01H 9/0214 200/302.2 |
| 9,460,872 B2 * | 10/2016 | Kirbawy | ............... | H01H 13/063 |
| 9,728,350 B2 * | 8/2017 | Muller | ................... | H01H 13/04 |
| 9,852,854 B1 * | 12/2017 | Wang | ................. | H01H 13/7065 |

* cited by examiner

*Primary Examiner* — Felix O Figueroa
(74) *Attorney, Agent, or Firm* — Muncy, Geissler, Olds & Lowe, P.C.

(57) ABSTRACT

A waterproof keyboard, including a keypad and a plurality of keys passing through the keypad. The keypad includes a compressive waterproof layer, a plate structure, and a plurality of through-holes, the compressive waterproof layer covering the plate structure, and the through-hole passing through the compressive waterproof layer and the plate structure. Each of the keys passes through one of the through-holes, and the compressive waterproof layer and the plate structure are clamped by means of a slot that is formed on a lateral surface of the key, to enable the key to be sealed with the compressive waterproof layer to form a sealed layer, so as to achieve the waterproof effect.

6 Claims, 4 Drawing Sheets

WATERPROOF KEYBOARD

FIELD OF THE INVENTION

The present invention relates to a waterproof keyboard, and in particular, to a waterproof keyboard in which waterproof configuration is implemented after keys are assembled on a keypad.

BACKGROUND OF THE INVENTION

Keyboards are indispensible devices for people when using computers nowadays. There are many keys on a keyboard, for being pressed by a user so as to input instructions. As shown in FIG. 1, the structure of a conventional keyboard 9 includes a keypad 91, a circuit board 92, and a plurality of keys 93. The keys 93 correspondingly pass through a plurality of through-holes of the keypad 91, to be connected to the circuit board 92, for being pressed by a user.

However, due to the tolerance of and the materials used in a manufacturing process for each key 93 and the keypad 91, it is easy for dusts/liquids to float into/penetrate into gaps (positions of the through-holes) between the key 93 and the keypad 91, and then stay above the circuit board 92, which may seriously interfere a circuit/light-path of the key 93, and generate signal misjudgement because of incapability of accurately transmitting a signal, thereby influencing the precision. Furthermore, the dusts/liquids fall onto the circuit board 92, which may cause poor contact or even damage of the circuit board 92. Therefore, the conventional keyboards still need to be improved.

SUMMARY OF THE INVENTION

A main objective of the present invention lies in providing a waterproof keyboard, wherein a keypad of the waterproof keyboard is constructed by a compressive waterproof layer and a plate structure, the compressive waterproof layer and the plate structure are clamped at the same time when a key passes through the keypad, to enable the key and the compressive waterproof layer to construct a sealed layer together.

A preferred embodiment concept of the present invention lies in providing a waterproof keyboard, comprising:

a keypad, comprising a compressive waterproof layer, a plate structure, and a plurality of through-holes, the compressive waterproof layer covering the plate structure, and the through-holes passing through the compressive waterproof layer and the plate structure;

a plurality of keys, passing through the through-hole, and each of the keys comprising:

a shell, an opening portion being formed on an upper surface of the shell, and a slot being formed on a lateral surface of the shell, wherein the shell passes through the compressive waterproof layer and the plate structure, and the compressive waterproof layer and the plate structure are clamped by the slot, to enable the shell to be sealed with the compressive waterproof layer; and a trigger mechanism, passing through the opening portion of the shell, to receive an external force so as to move relative to the shell; and a circuit board, located below the trigger mechanism, and to be triggered by movement of the trigger mechanism.

The waterproof keyboard according to claim 1, wherein the cross sectional area of the shell gradually decreases from a lower flange of the slot to a lower surface of the shell.

In a preferred embodiment, the compressive waterproof layer is formed on an upper surface of the plate structure by means of spraying.

In a preferred embodiment, the compressive waterproof layer is made of an elastic material.

In a preferred embodiment, the elastic material is selected from at least one of a Polyurethane (PU) waterproof material, a PolyVinyl Chloride (PVC) waterproof material, and a silica waterproof material.

In a preferred embodiment, a positioning post is formed on a lower surface of the shell, a plurality of positioning holes is provided in the circuit board, and each of the positioning posts is inserted into one of the positioning holes in the circuit board for fixing.

DETAILED DESCRIPTION OF THE PREFERRED EMBODIMENT

Figure 1:
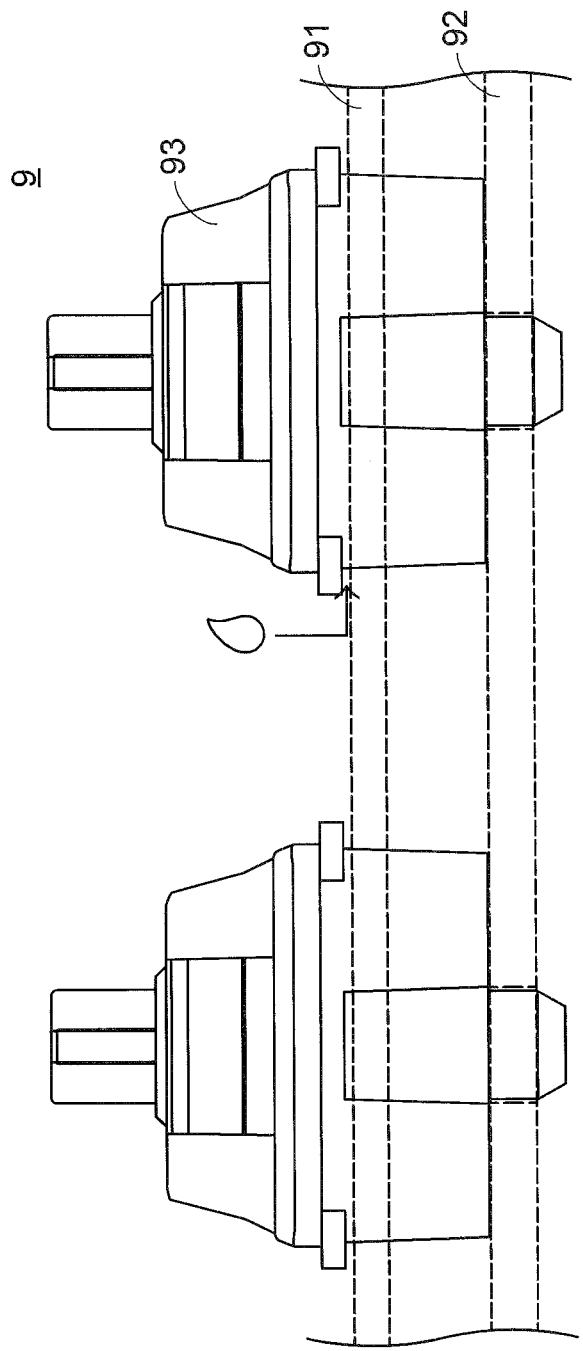
FIG. 1 is a schematic cross-sectional diagram of a conventional waterproof keyboard.
Figure 2:
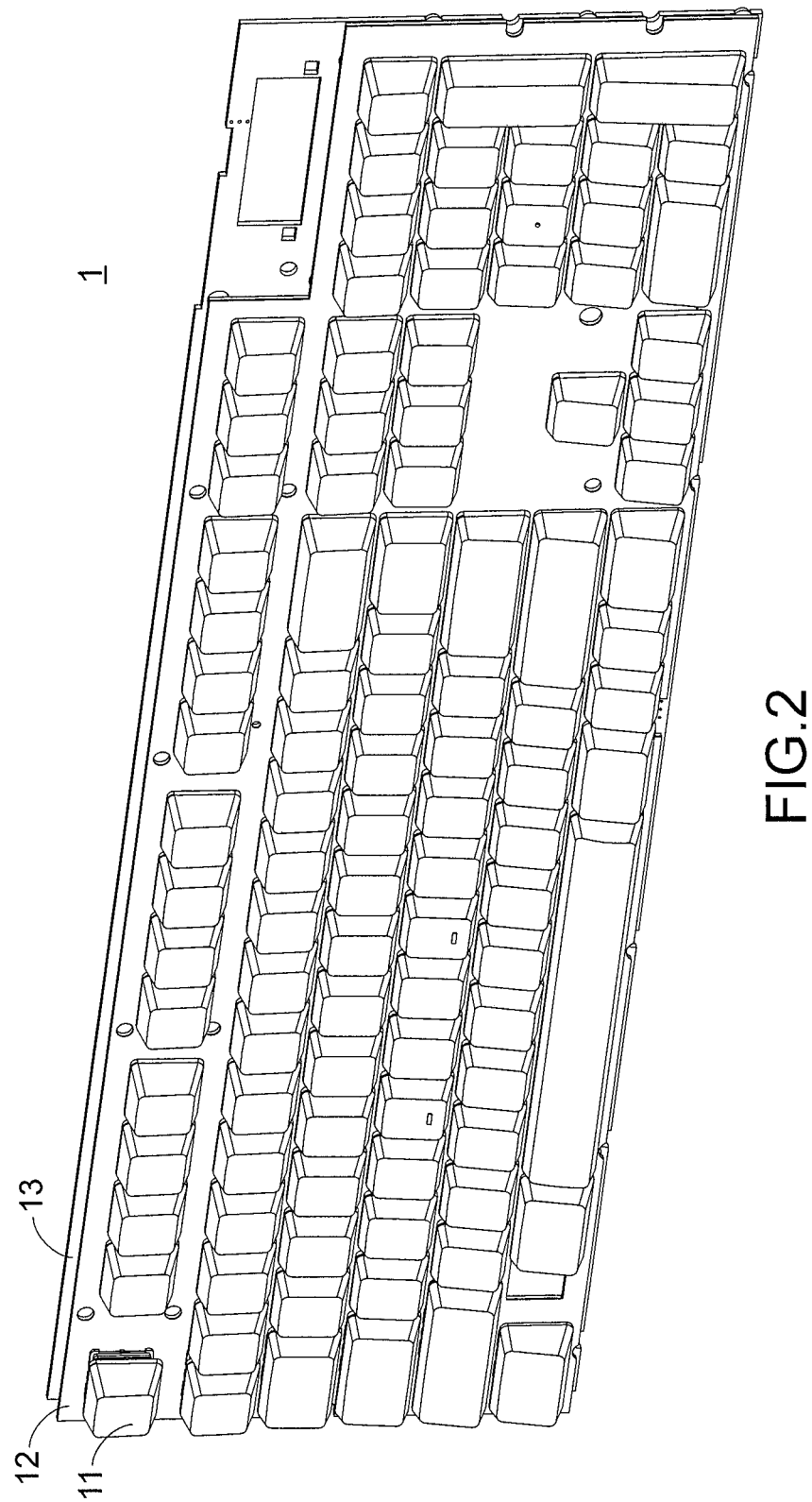
FIG. 2 is a schematic three-dimensional diagram of a waterproof keyboard of the present invention.
Figure 3:
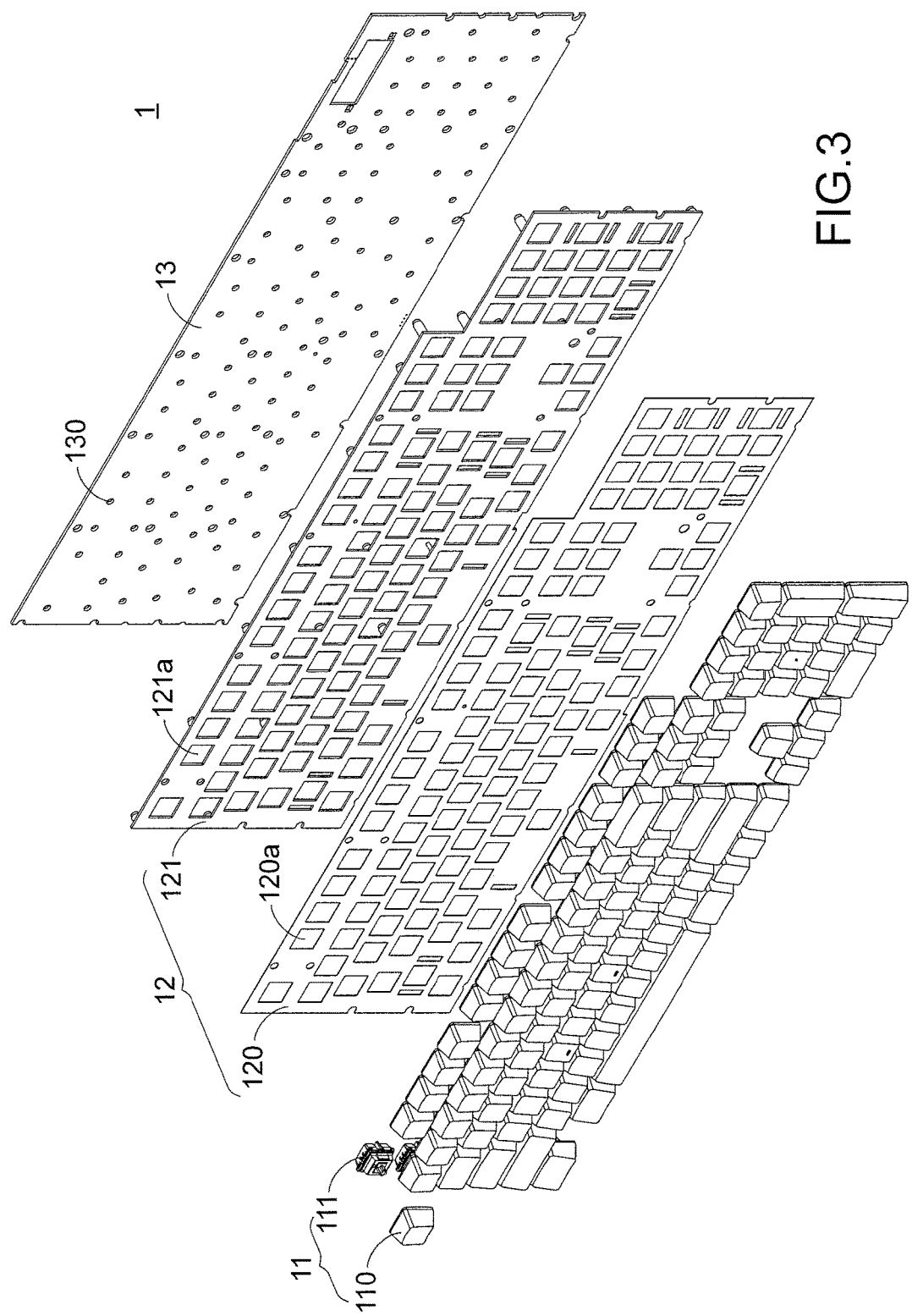
FIG. 3 is a schematic exploded diagram of the waterproof keyboard of the present invention.

FIG. 2 is a schematic three-dimensional diagram of a waterproof keyboard of the present invention. FIG. 3 is a schematic exploded diagram of the waterproof keyboard of the present invention. As shown in FIG. 2 and FIG. 3, a waterproof keyboard includes a plurality of keys 11, a keypad 12, and a circuit board 13. The plurality of keys 11 pass through the keypad 12 and press against the circuit board 13, such that the circuit board 13 can be triggered to generate an input signal when a user presses the key 11. The keypad 12 consists of two components and includes a compressive waterproof layer 120 and a plate structure 121, and a plurality of through-holes 120a, 121a are formed on the compressive waterproof layer 120 and the plate structure 121, for the keys 11 to pass through.

Figure 4:
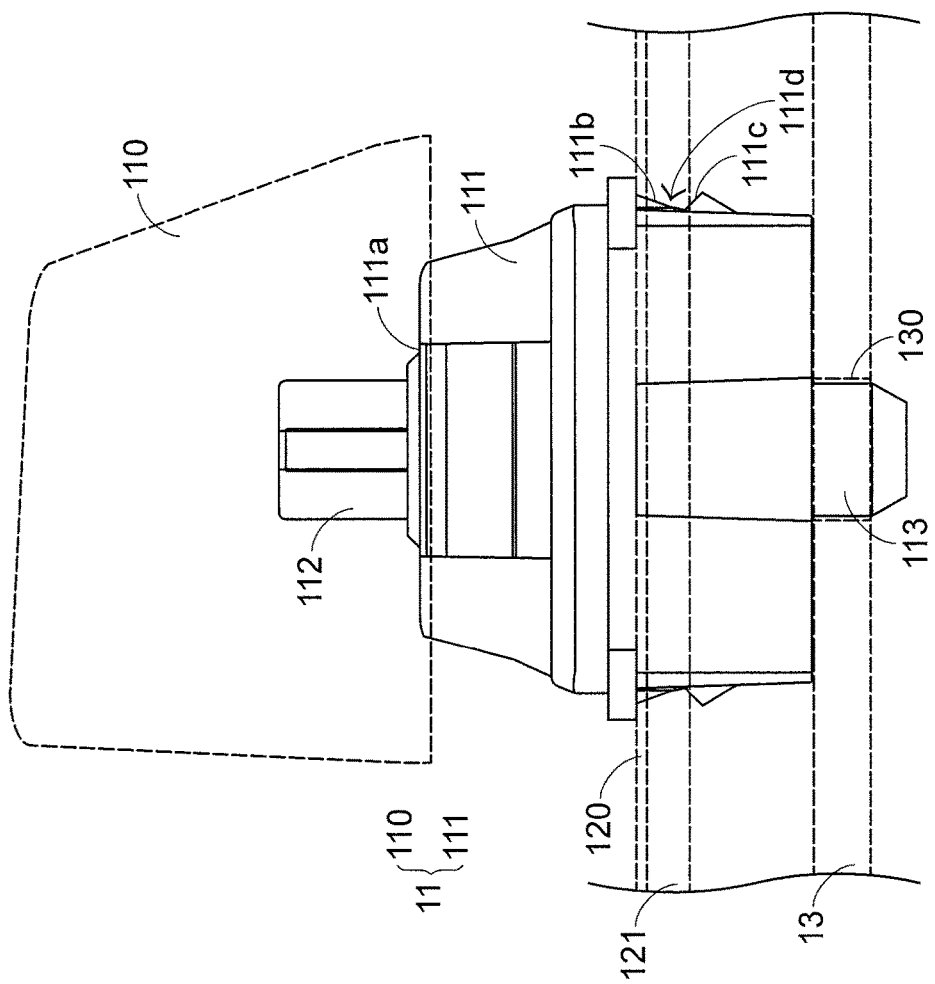
FIG. 4 is a schematic profile diagram of one key of the waterproof keyboard of the present invention.

FIG. 4 is a schematic profile diagram of one key of the waterproof keyboard of the present invention. Refer to FIG. 3 and FIG. 4. The compressive waterproof layer 120 covers and stacks on the plate structure 121, and a housing (not shown) wraps the compressive waterproof layer 120 and the plate structure 121. An opening needs to be provided on the housing, for the key 11 to pass through the keypad 12 from the opening. In addition, the plurality of through-holes 120a, 121a respectively are first through-holes 120a in the compressive waterproof layer 120 of the keypad 12, and second through-holes 121a in the plate structure 121 of the keypad 12, and the position of each first through-hole 120a is opposite to that of the second through-hole 121a. With such an arrangement, the keys 11 can be connected and fixed to the circuit board 13 after passing through the first through-holes 120a and the second through-hole 121a.

Each key 11 includes a shell 111 and a trigger mechanism 112. To make the figure concise, only the most left row of the trigger mechanism 112 is shown as an example. A top end of the trigger mechanism 112 is connected to a keycap 110 which is provided to be pressed by a user. The circuit board 13 is located below the trigger mechanism 112 and the circuit board 13 is fixed to the shell 111. The circuit board 13 can be triggered due to movement of the trigger mechanism 112. The key 11 can be selected from an optical key or a mechanical key. Preferably, each key 11 further includes an elastic element (not shown). A first end portion of the elastic element is pressed against a trigger element, and a second end portion of the elastic element is pressed against the shell 111. In this way, when the trigger mechanism 112 is pressed down, the trigger mechanism 112 moves downwards to at least one pressed position. When the keycap 110 is released, the trigger mechanism 112 returns to an initial position from the pressed position by means of the elastic element.

Besides, a positioning post 113 is formed on a lower surface of each shell 111, and a plurality of positioning holes 130 is formed on the circuit board 13, such that each positioning post is inserted into one positioning hole 130 in the circuit board 13 for fixing.

Please refer to FIG. 4 again. An upper flange 111b and a lower flange 111c are protruding outward from a lateral surface of the shell 111. These two flanges 111b, 111c commonly define a slot 111d. The cross sectional area of the shell 111 gradually decreases from the lower flange to a lower surface of the shell 111. By means of the configuration, it is convenient to insert the keys 11 into the compressive waterproof layer 120 and the plate structure 121. Moreover, when the keys 11 pass through the compressive waterproof layer 120 and the plate structure 121, the slots 111d clamp the compressive waterproof layer 120 and the plate structure 121. At this moment, the compressive waterproof layer 120 is slightly deformed due to clamping by the upper flange of the shell 111 and the plate structure 121, thereby achieving an effect of tightly sealing the shell 111 and the compressive waterproof layer 120. That is, when the keys 11 are assembled to the keypad 12, an assembling force applied by an assembler would drive the keys 11 to press against the compressive waterproof layer 120 of the keypad 12, and make the gap between the keys 11 and the keypad 12 seamless, thereby preventing entrance of a liquid.

In a preferred embodiment, the compressive waterproof layer 120 is made of an elastic material, and is an integrally formed structure, which stacks on an upper surface of the plate structure 121. The elastic material is selected from at least one of a Polyurethane (PU) waterproof material, a PolyVinyl Chloride (PVC) waterproof material, and a silica waterproof material. In another preferred embodiment, the compressive waterproof layer 120 is formed on an upper surface of the plate structure 121 by means of spraying.

In view of the above, by means of the configuration of the waterproof keyboard of the present invention, in which the compressive waterproof layer is added onto the plate structure and the compressive waterproof layer is clamped onto the plate structure by means of a slot on a side of the key 11. With such an arrangement, the waterproof and dustproof effects of which external dusts and droplets are not apt to fall onto a circuit board are achieved.

The embodiments are used only to describe the principles and effects of the present invention, and state the technical features of the present invention, instead of limiting the protection scope of the present invention. Any changes or equivalent modifications that can be easily implemented by a person skilled in the art without departing from the technical principle and spirit of the present invention all fall within the protection scope of the present invention. Therefore, the protection scope of the present invention is subject to the claims.

What is claimed is:

1. A waterproof keyboard, comprising:
a keypad, comprising a compressive waterproof layer, a plate structure, and a plurality of through-holes, the compressive waterproof layer covering the plate structure, and the through-holes passing through the compressive waterproof layer and the plate structure;
a plurality of keys, passing through the through-hole, and each of the keys comprising:
a shell, an opening portion being formed on an upper surface of the shell, and a slot being formed on a lateral surface of the shell, wherein the shell passes through the compressive waterproof layer and the plate structure, and the compressive waterproof layer and the plate structure are clamped by the slot, to enable the shell to be sealed with the compressive waterproof layer; and
a trigger mechanism, passing through the opening portion of the shell, to receive an external force so as to move relative to the shell; and
a circuit board, located below the trigger mechanism, and to be triggered by movement of the trigger mechanism.

2. The waterproof keyboard according to claim 1, wherein the cross sectional area of the shell gradually decreases from a lower flange of the slot to a lower surface of the shell.

3. The waterproof keyboard according to claim 1, wherein the compressive waterproof layer is formed on an upper surface of the plate structure by means of spraying.

4. The waterproof keyboard according to claim 1, wherein the compressive waterproof layer is made of an elastic material.

5. The waterproof keyboard according to claim 4, wherein the elastic material is selected from at least one of a Polyurethane (PU) waterproof material, a PolyVinyl Chloride (PVC) waterproof material, and a silica waterproof material.

6. The waterproof keyboard according to claim 1, wherein a positioning post is formed on a lower surface of the shell, a plurality of positioning holes is provided in the circuit board, and each of the positioning posts is inserted into one of the positioning holes in the circuit board for fixing.

* * * * *